United States Patent [19]

Witt et al.

[11] Patent Number: 4,819,775

[45] Date of Patent: Apr. 11, 1989

[54] FREE WHEEL WITH CLAMPING BODIES

[75] Inventors: Arnold Witt, Oberursel; Alfred Skrivanek, Limeshain, both of Fed. Rep. of Germany

[73] Assignee: Kloeckner-Humboldt-Deutz AG, Fed. Rep. of Germany

[21] Appl. No.: 91,882

[22] Filed: Sep. 1, 1987

[30] Foreign Application Priority Data

Sep. 3, 1986 [DE] Fed. Rep. of Germany ....... 3629999

[51] Int. Cl.$^4$ .............................................. F16D 41/07
[52] U.S. Cl. .................... 192/41 A; 192/45.1
[58] Field of Search ............................. 192/41 A, 45.1

[56] References Cited

U.S. PATENT DOCUMENTS

| | | | |
|---|---|---|---|
| 2,711,238 | 6/1955 | Szady | 192/45.1 |
| 2,901,072 | 8/1959 | Maurer et al. | 192/45.1 |
| 3,019,873 | 2/1962 | Ferris et al. | 192/45.1 |
| 3,613,846 | 10/1971 | Zlotek | 192/41 A |
| 3,651,908 | 3/1972 | Oldfield | 192/45.1 |
| 3,844,391 | 10/1974 | Hallerberg et al. | 192/41 A |

FOREIGN PATENT DOCUMENTS 1915567  10/1970  Fed. Rep. of Germany .

Primary Examiner—Rodney H. Bonck
Attorney, Agent, or Firm—Charles L. Schwab

[57] ABSTRACT

A method for achieving a predetermined pressure behavior of the clamping bodies (1) of a free wheel, for which the pressure force can be determined and adjusted in advance. The position of the center of gravity (S) of the clamping body (1) is changed by removing material from the clamping bodies to achieve a predetermined pressure behavior.

5 Claims, 2 Drawing Sheets

FREE WHEEL WITH CLAMPING BODIES

TECHNICAL FIELD

This invention relates to a method of effecting a predetermined pressure behavior of the clamping bodies of a free wheel.

PRIOR ART STATEMENT

West German patent DE-OS No. 19 15 567 shows and describes a free wheel having clamping bodies, which are kept in a containment and arranged between a cylindrical inner ring and a cylindrical outer ring. Whenever a rotational movement occurs, for example, along the actuated outer ring, the clamping bodies transfer the rotational movement to the inner ring while, if there is an opposite rotational movement of the outer ring, no transfer of power occurs. In addition, the transfer of power is interrupted as soon as the inner ring rotates in the direction first specified at a higher speed than the outer ring. In this latter case, the free wheel functions as an overrunning clutch. With free wheels of this type a fundamental problem occurs in that at least partially increased abrasion occurs because of the slipping motion between the clamping bodies and the inner ring when the contact pressure forces are too great at the inner ring. This is caused by, among other things, the fact that when there is increased clamping force between the inner ring and the clamping bodies, there is no longer any effective hydrodynamic lubrication. In addition, an exact switching point does not exist between the free wheel function and the clamping function with a free wheel of this type. This results in an undesirable switching hysteresis which can lead to a failure or deterioration of the free wheel.

OBJECTS AND BRIEF SUMMARY OF THE INVENTION

A main object of this invention is the provision of a method of effecting a predetermined contact pressure of the clamping bodies with the inner ring and, more particularly, a method by which the pressure force of the clamping bodies can be adjusted.

These objects are met by the method steps of determining the position of the center of gravity of the clamping bodies, determining the moment in effect on the clamping bodies around the contact line between the latter and the outer ring resulting from the resilient biasing force and the centrifugal force, and adjusting the moment created by the centrifugal force to attain a predetermined contact pressure by removing material from the clamping bodies to modify the position of the center of gravity of such bodies.

Clamping bodies are generally fabricated as a continuous drawn part using a drawing die. After the drawing process is completed, the continuous drawn part is divided into individual segments which are used as clamping bodies. Due to the abrasion during the drawing process, the drawing die must be refurbished or replaced after a certain fabricating period. Since the drawing die wear during use, slight variations result in the contour for every lot of clamping bodies fabricated with a drawing die, and these variations lead to the disadvantages of unequal pressure behavior. An object of this invention is to eliminate this unequal pressure behavior among the clamping bodies. The position of the center of gravity of the clamping bodies is determined, for example, in a moment drag test with maximum speed in freewheeling condition. The pressure behavior of the clamping body can be established on the basis of the knowledge of the position of the center of gravity of the clamping bodies, together with the total moment resulting from the resilient and centrifugal forces acting on each clamping body at a certain speed. These forces create moments about a line of contact between a partially cylindrical area of the clamping body and the outer ring. If the total moment is set at less than zero the centrifugal moment overcomes the resilient biasing moment and the clamping bodies no longer come into contact with the inner ring during the freewheeling process. If neutral behavior of the free wheel is desired, the centrifugal force vector which runs through the center of gravity must intersect the "contact line." If the effects of constant centrifugal force pressure are required, the total moment must increase with increasing speed. A sufficient degree of readiness to engage is also desired at high speeds. Since the centrifugal force vector always runs through the center of gravity of a clamping body, the position of the center of gravity of the clamping body and, with it, its pressure behavior is modified by removing material from the clamping bodies as determined and achieved in accordance with this invention.

Preferably material is removed from the laterally opposite side surfaces of the clamping bodies. These parallel side surfaces are reshaped by removing material to leave new surfaces disposed at a specific angle to the original lateral side surfaces.

Material may be removed from first corresponding end portions of the lateral side surfaces of the clamping bodies without regard to the center of gravity and then material may be removed from second corresponding end portions of the lateral side surfaces dependent on the position of the center of gravity. For instance, the rear end positions of the lateral side surfaces may be bevelled independently of the position of the center of gravity as by, for example, grinding to a specific dimension, while the opposite or front end portions of the lateral side surfaces are then bevelled off to an equal or other angle to such an extent that the desired position of the center of gravity of the clamping body has been attained. The bevelling-off process on both the front and rear end portions of the lateral side surfaces of the clamping body is advantageous in that the potential for tilting a clamping body so formed is increased.

One or more blind boreholes may be formed in at least one side surface of a clamping body. Because of the blind borehole, the position of the center of gravity of the clamping body is also modified and a displacement of the center of gravity which is undertaken in this way can be used alone or as a supplement to one of the previously described measures for altering the position of the center of gravity. A particular advantage lies in the introduction of a blind borehole as a supplement to an alteration in the center of gravity which is undertaken by bevelling off one or several sides of the lateral side surfaces. In this case the bevelling off is utilized above all else for optimizing the tilt potential of the clamping body while the subsequent alteration of the position of the center of gravity is achieved through forming blind boreholes.

This invention has particular utility in free wheels in which the centrifugal force has an effect on the pressure behavior of the bodies and, with this, the wear behavior, especially with free wheels with high speeds, such as those used for auxiliary equipment for airplanes.

DETAILED DESCRIPTION OF THE DRAWINGS

Figure 1:
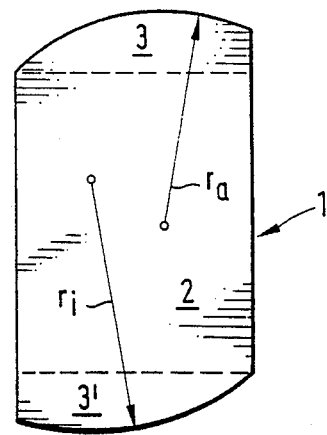
FIG. 1 is a side view of a clamping body.

The clamping body 1 shown in FIG. 1 is fabricated from a continuous drawn part and consists of, in its unfinished condition, a parallelepiped 2, the radially opposite sides of which are symmetrically arranged partially cylindrical areas 3, 3' formed on radii $r_a$ and $r_i$.

Figure 2:
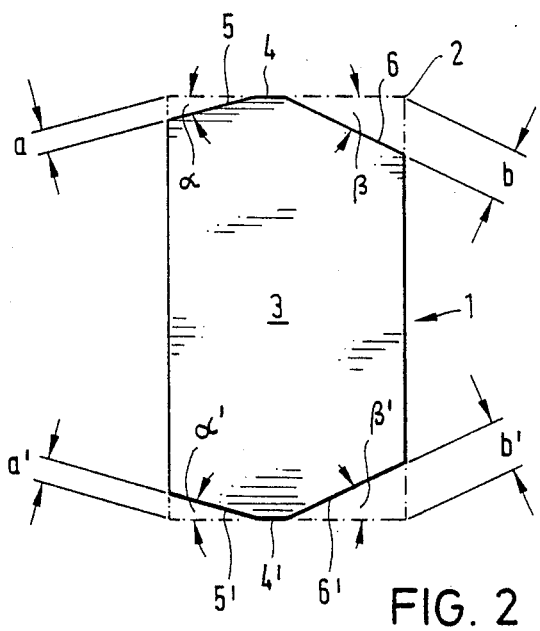
FIG. 2 is a top view of the clamping body shown in FIG. 1.

The clamping body shown in FIG. 2 has been machined to produce bevelled off areas 5, 5' and 6, 6' at the lateral side surfaces 4, 4' which intersect the side edges of the partially cylindrical areas 3, 3'. The bevelled areas 5, 5' are at equal angles $\alpha$, $\alpha'$, to the original lateral side surfaces 4, 4'. The rear portions or corners of clamping body 1 may be bevelled off by milling to dimensions a and a' in order to form the bevelled surfaces 5, 5', respectively. The dimensions a, a' are equal and are set independently of the center of gravity of the clamping body. The front portions of the laterally opposite side surfaces 4, 4' are bevelled off to form forwardly converging bevelled surfaces 6, 6' which are inclined, respectively, at equal angles B, B' relative to the original lateral side surfaces 4, 4'. Equal dimensions b, b' of material are removed from the front corners of the clamping body to form the bevelled-off areas 6, 6'. The values of b, b' and B, B' are calculated in such a way that the position of the center of gravity of the clamping body 1 is positioned in a predetermined location. The values b, b' and B, B' are ascertained by means of a drag moment test at maximum speed in free-wheeling condition. In using the method of this invention it is sufficient to carry out one drag moment test of this kind for a clamping body fabricated with a drawing die. Previously the correlation between the drag moment and volume of the material that needed to be removed was determined only from drag moment tests with different volumes of material removed.

Figure 3:
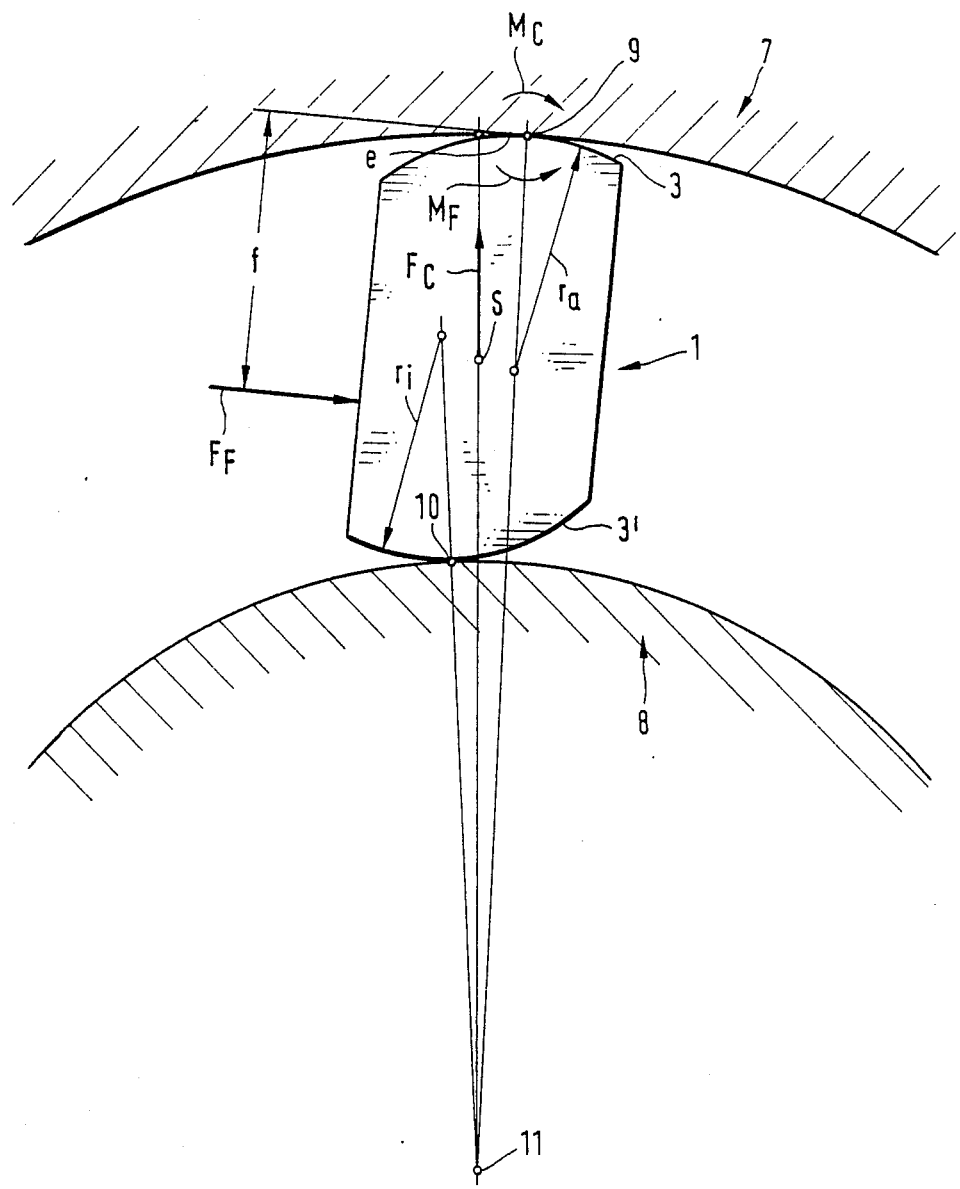
FIG. 3 is a partial section view of a free wheel showing a clamping body between an inner ring and an outer ring.

The clamping body 1, as shown in FIG. 3, is in its pressure position between an outer ring 7, partially shown, and an inner ring 8, partially shown, which share a common axis 11. The radially outer partially cylindrical area 3 of the clamping body 1 is in radially outward thrust transmitting engagement with the outer ring 7 on a contact line 9 and also has an axis of contact with the radially inner partially cylindrical area 3' of the inner ring 8 on contact line 10. At a particular rotational speed the centrifugal force $F_C$ acting through the center of gravity S and a resilient biasing force $F_F$ urges the clamping body 1 into engagement, on contact lines 9 and 10, with the outer ring 7 and the inner ring 8. Relative to the contact line 9, the centrifugal force $F_C$ forms a centrifugal moment $M_C$ ($M_c = F_c \times$ distance $e$) about the contact line 9. The resilient biasing moment $M_F$ is calculated from the product of the resilient force $F_F$ and the clearance f between the effective line of resilient force $F_C$ and the contact line 9. The contact lines 9, 10 of the inner ring 8 and the outer ring 7 are determined by the geometric positions of the centers of the radii $r_r$ and $r_a$ of the partial cylindrical surfaces 3, 3' on which the contact lines 9, 10 lie.

If the addition of moments $M_F$ and $M_C$ adds up to a total moment less than zero, the free wheel is adjusted to overcome the effect of centrifugal force, while it is adjusted to be neutral if the contact line 9 is intersected by a resulting force vector passing through the center of gravity. A centrifugal force pressuring effect is achieved if the total moment is greater than zero.

The embodiments of the invention in which an exclusive property or privilege is claimed are defined as follows:

1. A method of establishing a predetermined drag contact pressure for a set of spring biased clamping bodies during an overrunning operation of a free wheel wherein the clamping bodies (1) are in radially outward thrust transmitting engagement with a cylindrical outer ring (7) and wherein the clamping bodies (1) are operatively arranged between a cylindrical inner ring (8) and the cylindrical outer ring (7) of the free wheel, and each have a first partially cylindrical area (3) on its radially outer side engaging the outer ring (7) on a contact line (9) about which the spring biasing tends to rotate them forwardly and a second partially cylindrical area (3') on its radially inner side engageable with the inner ring (8) along a contact line (10), comprising the steps of:
   determining the position of the center of gravity (S) of a clamping body (1);
   determining the moment acting on said one body about said contact line (9) between said outer ring (7) and said first partially cylindrical area (3) caused by the spring force ($F_F$) and centrifugal force ($F_C$) acting on said body and
   changing the centrifugal force induced moment ($M_c$) acting on said body by removing material from the opposite lateral side surfaces (4, 4') at one of the front and rear portions of the latter and at predetermined angles ($\alpha$, $\alpha'$ or B, B') to said lateral side surfaces (4, 4') thereby forming converging bevelled surfaces (5, 5' or 6, 6') on said body so as to change the position of the center of gravity (S) of said body.

2. The method of claim 1 wherein the centrifugal force induced moment ($M_c$) is changed by removing material from the front and rear portions of the opposite lateral side surfaces (4, 4') of said clamping body (1) at predetermined angles ($\alpha$, $\alpha'$, B, B') to said lateral side surfaces (4, 4').

3. The method of claim 2 wherein the volume of the material removed from said clamping body (1) for achieving said predetermined drag contact pressure of the clamping bodies (1) is determined by a drag moment test at the inner ring (8) in which the friction moment which is caused by the pressure forces of the clamping bodies (1) is measured at the inner ring (8) at maximum speed in a freewheeling operation of said free wheel.

4. The method of claim 2 and further comprising the step of removing material from the rear portions of said lateral side surfaces (4, 4') without regard to the position of the center of gravity of said clamping body (1) prior to removing material from the front portions of said lateral side surfaces (4, 4') to change the position of the center of gravity (S) and the centrifugal force induced moment.

5. The method of claim 4 wherein the volume of material removed from the clamping bodies (1) for achieving said predetermined drag contact pressure of the clamping bodies (1) is determined by a drag moment test at the inner ring (8) in which the friction moment which is caused by the pressure force of the clamping bodies (1) is measured at the inner ring (8) at maximum speed in a freewheeling operation of said free wheel.

* * * * *

UNITED STATES PATENT AND TRADEMARK OFFICE
CERTIFICATE OF CORRECTION

PATENT NO. : 4,819,775

DATED : April 11, 1989

INVENTOR(S) : Arnold Witt and Alfred Skrivanek

It is certified that error appears in the above-identified patent and that said Letters Patent is hereby corrected as shown below:

Col. 3, line 23, "$a, a'$" should read -- $\alpha, \alpha'$ --;

Col. 4, line 35, "($a, a'$ or B, B')" should read --($\alpha, \alpha'$ or B, B')--;

Col. 4, line 43, "($a, a'$, or B, B')" should read --($\alpha, \alpha'$ or B, B')--.

Signed and Sealed this

Twenty-eighth Day of November 1989

Attest:

JEFFREY M. SAMUELS

Attesting Officer     Acting Commissioner of Patents and Trademarks